United States Patent [19]

Mahn et al.

[11] 3,959,176

[45] May 25, 1976

[54] NON-FOAMING DISPERSING COMPOSITION

[75] Inventors: Frederick R. Mahn, Verona; Emil A. Ippolito, Chatham, both of N.J.

[73] Assignee: Drew Chemical Corporation, Parsippany, N.J.

[22] Filed: Sept. 9, 1974

[21] Appl. No.: 504,099

[52] U.S. Cl............................. 252/352; 252/356; 252/357; 252/358; 260/878 B
[51] Int. Cl.².................. B01F 17/00; B01F 17/30; B01F 17/16; B01D 17/00
[58] Field of Search ........... 252/320, 331, 352, 356, 252/358, 357; 260/878 B

[56] References Cited
UNITED STATES PATENTS

| | | | |
|---|---|---|---|
| 2,964,478 | 12/1960 | Monson | 252/331 |
| 3,021,372 | 2/1962 | Dupre | 252/352 |
| 3,076,768 | 2/1963 | Boylan | 252/358 |
| 3,078,315 | 2/1963 | Steele | 252/352 |
| 3,207,698 | 9/1965 | Liebling | 252/321 |
| 3,408,306 | 10/1968 | Boylan | 252/321 |
| 3,557,017 | 1/1971 | Mange | 252/358 |
| 3,697,442 | 10/1972 | Lieberman | 252/358 |
| 3,714,068 | 1/1973 | Miller | 252/358 |
| 3,784,479 | 1/1974 | Keil | 252/358 |
| 3,786,081 | 1/1974 | Oppenlaender | 252/358 |

*Primary Examiner*—Benjamin R. Padgett
*Assistant Examiner*—Donald P. Walsh
*Attorney, Agent, or Firm*—Marn & Jangarathis

[57] ABSTRACT

A solid non-foaming dispersing composition of (1) hydrophobic silica; (2) block copolymer of polyoxyethylene and polyoxypropylene wherein the chain is terminated, at both ends, by polyoxypropylene; and (3) an organic spreading liquid. A surfactant may also be employed. A tablet form of the composition is described.

13 Claims, No Drawings

NON-FOAMING DISPERSING COMPOSITION

This invention relates to a non-foaming dispersant composition and the utilization thereof. More particularly, this invention relates to a composition and a method for eliminating fouling in water and polar organic systems.

In many systems, contamination and fouling present a severe problem. Thus, for example, in air washing and cooling water systems used, for example, in air conditioning, various process cooling and the like, contamination of the water with various liquid and solid foulants, such as oils, presents serious problems in that such foulants coat and foul heat transfer surfaces.

There have been many attempts to eliminate such fouling, but in general, such attempts have met with only limited success as a result of either excessive foaming or incompatibility with various additives, such as corrosion inhibitors or biocides, which are present in the cooling water.

An object of this invention is to provide a new and improved dispersant composition.

Another object of this invention is to provide a composition which is capable of dispersing foulants and/or cleaning fouled surfaces.

A further object of this invention is to provide for such dispersing and/or cleaning without foaming.

These and other objects of the present invention should become apparent from reading the following description thereof.

In accordance with the present invention, there is provided a non-foaming, water soluble dispersant composition comprised of (1) hydrophobic silica; (2) a block copolymer of polyoxypropylene and polyoxyethylene wherein the end blocks, at both ends, of the block copolymer chain are polyoxypropylene; and (3) an organic spreading liquid, the components being present in an amount effective to disperse contaminants in aqueous and polar organic systems without foaming.

The term "water soluble" as used herein means that the composition is soluble in the system in corrosion inhibiting amounts.

More particularly, the hydrophobic silica component of the composition, as known in the art, is prepared from hydrophillic silica which is treated to render the silica hydrophobic. One suitable method for rendering the silica hydrophobic is to permanently affix a liquid hydrophobic polysiloxane oil onto the silica particles. Hydrophobic silica is well known in the art and, accordingly, no detailed description thereof is deemed necessary for a complete understanding of the present invention. The preparation and use of hydrophobic silica is described in U.S. Pat. Nos. 3,207,698, 3,408,306; and 3,076,768, as well as the references referred to in such patents, all of which are hereby incorporated by reference. A preferred silica is a precipitated silica, such as the precipitated silica sold as Quso-G30.

The second component of the composition of the present invention is a block copolymer of polyoxyethylene and polyoxypropylene having the following structural formula:

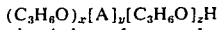

$(C_3H_6O)_x[A]_y[C_3H_6O]_zH$ wherein A is polyoxyethylene or a block copolymer of polyoxypropylene and polyoxyethylene. $x, y, z$ are integers greater than 1 to provide a block copolymer having weight average molecular weight from about 1000 to about 25,000, preferably from about 1500 to about 15,000, with polyoxyethylene being present in the block copolymer in an amount from about 5% to about 80%, preferably from about 20% to about 80% and most preferably 40 to 80%, all by weight.

The third component of the composition is a water insoluble, organic spreading liquid of the type which is generally employed as a carrier in known defoaming compositions; however, unlike such conventional defoaming compositions, the three component composition of the present invention is a solid. (It is to be understood, however, that the fact that the three component composition is a solid is not intended to preclude the use of the composition of the present invention dispersed or dissolved in a suitable liquid vehicle or carrier). The organic liquids employed in the composition of the present invention are generally liquid hydrocarbons, including mixtures thereof, which can be aliphatic, aromatic or alicyclic; such as mineral hydrocarbons, including mineral oils; i.e., paraffin oil, naphthenic oils, kerosene; mineral seal oil, naphtha, benzene, heptane, octane, etc.; liquid halohydrocarbons; long chain alcohols, such as oxoalcohols ($C_{10}$ and higher) nonyl or octyl alcohol, etc., long chain amine; such as 2-ethyl-1-aminoheptane; etc., long chain esters, such as, diglycol laurate, fatty acids, such as vegetable oils, etc.

The preferred organic liquids are hydrocarbons, preferably those having a viscosity of about 30 SUS to 400 SUS at 100°F., and a boiling point of at least 150°F, and long chain alcohols, in particular long chain oxoalcohols ($C_{10}$-$C_{18}$) and mixtures thereof with hydrocarbons.

The three components are employed in a non-foaming dispersing amount, with the hydrophobic silica generally being present in amounts from about 0.1% to about 10%, preferably 0.1% to about 1.0%; the block copolymer in an amount from about 10% to about 90%, preferably from about 75% to about 85%; and the organic liquid in an amount from about 5% to about 35%, preferably from about 10% to about 25%, all by weight, based on the three components.

In accordance with a preferred composition of the present invention, in addition to the hereinabove described three components, the composition further includes a surfactant in that improved properties are obtained by use of such a surfactant. The surfactant may be either a cationic, anionic or non-ionic surfactant, as known in the art.

Examples of suitable anionic emulsifiers are alkali metal, ammonium, and amine soaps; the fatty acid part of such soaps contains preferably at least 16 carbon atoms because soaps based on lauric and myristic acids have a great tendency to develop abundant foam. The soaps also can be formed "in situ"; in other words, a fatty acid can be added to the oil phase and an alkaline material to the aqueous phase.

Other examples of suitable anionic emulsifiers are alkali metal salts of alkyl-aryl sulfonic acids, sodium dialkyl sulfo-succinate, sulfated or sulfonated oils, e.g., sulfated castor oil; sulfonated tallow, and alkali salts of short chain petroleum sulfonic acids.

Examples of suitable cationic emulsifiers are salts of long chain primary, secondary, or tertiary amines, such as oleylamine acetate, cetylamine acetate, di-dodecylamine lactate, dilauroyl triethylene tetramine diacetate, 1-aminoethyl-2-heptadecenyl imidazoline acetate; and quaternary salts, such as cetylpyridinium bromide, hexadecyl ethyl, morpholinium chloride, and diethyl didodecyl ammonium chloride.

Examples of suitable non-ionic emulsifiers are condensation products of higher fatty alcohols with ethylene oxide, such as the reaction product of oleyl alcohol with 10 ethylene oxide units; condensation products of alkylphenols with ethylene oxide, such as the reaction product of isooctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitolanhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10 to 15 molecules of ethylene oxide, mannitan monopalmitate reacted with 10 to 15 molecules of ethylene oxide; long chain polyglycols in which one hydroxyl group is esterified with a higher fatty acid and the other hydroxyl group is etherified with a low molecular weight alcohol, such as methoxypolyethylene glycol 550 monostearate (550 meaning the average molecular weight of the polyglycol ether), ethoxylated castor oil, etc. A combination of two or more of these emulsifiers may be used; e.g., cationic may be blended with a nonionic or an anionic with a nonionic.

The surfactant is generally used in an amount from about 0.5% to about 10%, preferably from about 1% to about 3%, all by weight, based on the four components.

The composition of the present invention may further contain a component to regulate the pH of the composition to be compatible with the pH of the system in which the composition is to be employed. The pH of the composition can range from pH 1 to 14 and can be regulated by the addition of a Lewis acid or base to the composition in an amount sufficient to provide the required pH. The pH regulator can comprise from 10 to 90%, by weight, of the composition.

The composition of the present invention is comprised of the three hereinabove described essential components, and preferably also a surfactant, but it is to be understood that the overall composition may include other components, as known in the art, such as colorants, odorants, hydrophobic components, thickeners, etc. Similarly, although the composition is preferably employed in solid form, as hereinabove described, the composition may be dissolved or dispersed in a liquid vehicle or carrier.

In accordance with a particularly preferred embodiment, the composition of the present invention is employed in tablet form. The composition may be formed into a tablet, by general procedures known in the art, by using a suitable tableting lubricant, such as a metal stearate, such as calcium stearate. The tablet may include other tableting components, such as, a binder, such as hydrophillic silica. The use of the composition in tablet form provides a convenient means of using the composition in previously controlled quantities.

The composition of the present invention may be employed for dispersing a solid or liquid contaminant in either water or polar organic solvent systems, preferably water. In addition, the composition effectively cleans such solid or liquid contaminants from surfaces on which the contaminant has previously been deposited and, accordingly, the composition functions as both a cleaner and a dispersant. The term "contaminant" as used herein includes any component which is not readily dispersible in the water or polar organic solvent and includes, but is not limited to: edible oils, needle oils, lubricating oils, silt, mud, sludge, clay and the like. In addition, the composition effectively disperse solid substances, such as tobacco dust, which may be entrained in a water system.

The compositions are preferably employed in aqueous systems; e.g., the cooling water for air conditioning systems; process cooling systems in which cooling water is circulated through heat exchangers and/or cooling towers, air washers, etc. The water becomes contaminated with various substances either through leaks in the cooling system, in the case where water is used for indirect heat exchange, or as a result of the water being used in an open tower. Thus, for example, in many air conditioning systems employing cooling water, the cooling water is circulated through a cooling tower and becomes contaminated by substances in the surrounding atmosphere. The compositions of the present invention, upon being added to such water, cleanse previously contaminated surface and prevent future fouling of such surfaces by maintaining the contaminants dispersed in the water. In this manner, fouling of the heat exchange surfaces is prevented, and heat transfer efficiencies are maintained.

Although the compositions are preferably employed in aqueous system, it is to be understood that the compositions may be utilized in systems employing polar organic solvents with similar results.

In general, the compositions are added to the aqueous or polar organic system in an amount of at least 25 ppm. In general, the composition is not used in excess of about 4000 ppm in that no added beneficial effect is achieved from using greater amounts; however, it is to be understood, that, if desired, greater amounts could be employed. It is to be understood that the specific amount to be employed will vary with each system, and the selection of an optimum amount is deemed to be within the scope of those skilled in the art from the present teachings.

The following examples further illustrate the present invention, but it is to be understood that the scope of the invention is not to be limited thereby. Unless otherwise specified all parts and percentages are by weight.

EXAMPLE I

Tablets having the following compositions were prepared.

| A. | | |
|---|---|---|
| 35.1% | 1. | a block copolymer of polyoxyethylene and polyoxypropylene having the polyoxypropylene as end blocks (80% polyoxyethylene 20% polyoxypropylene-M.W. 9000 and sold under the mark Pluronic 25R8) |
| 0.22% | 2. | Hydrophobic Silica |
| 7.73% | 3. | a mixture of mineral seal oil and $C_{10}$ to $C_{18}$ oxoalcohols (JS-1) |
| 0.65% | 4. | mixture of castor oil ethoxylated with 15 moles of ethylene oxide (Lipal 15CO) amd Lauryl alcohol ethoxylated with 4 moles of ethylene oxide (Lipal 4LA) |
| 47.5% | 5. | Sodium carbonate (pH regulator) |
| 1.9% | 6. | Calcium stearate |
| 6.9% | 7. | Binder of Hydrophillic Silica (Syloid 244 Grade 68) |
| 100% | | |

-continued

| B. | |
|---|---|
| 35.0% | 1. Pluronic 25R8 |
| 0.22% | 2. Hydrophobic Silica |
| 7.63% | 3. Mineral Seal oil and $C_{10}$-$C_{18}$ oxoalcohols |
| 0.65% | 4. Lipal 15CO & Lipal 4LA |
| 47.3% | 5. Sodium Sulfate (pH regulator) |
| 31.8% | 6. Calcium stearate |
| 6.9% | 7. Syloid 244 |
| 0.5% | 8. Silano (a hydrophobic silica used as a processing aid in forming the tablets). |
| 100% | |

Composition A and B were each separately used in an aqueous cooling tower having a 300 gal. capacity in an amount (based on water) of 95 ppm along with 1000 ppm (based on water) of a contaminating oil. Additional Tablets are added when needed to maintain the concentration at about 95 ppm.

The operation in each case was observed for a period of 72 hours and there was no foaming and no deposition of oil on cooling tower parts.

Operation over a 72 hour period without use of the composition results in foaming and deposition of contaminating oil on cooling tower parts.

EXAMPLE II

The following compositions A through C were subjected to a foam test using 800 moles of aqueous test solution in an one liter cylinder. The solution is drawn through an outlet located near the bottom of the cylinder by a recirculation pump and returned to the top of the cylinder to produce foam.

The components of the composition are reported in parts per million present in the test solution, and the results are reported as maximum foam height (mls)/break time secs.

A.
| | |
|---|---|
| 1. Hydrophobic silica (Quso) | 0.25 ppm |
| 2. No. 7 Process oil (105.9SUS at 100°F) | 9.55–9.75ppm |
| 3. Pluronic 25 R8 (a block copolymer of polyoxyethylene and polyoxypropylene having end blocks of polyoxypropylene M. W. 9000; 80% polyoxyethylene) | 40 ppm |
| 4. Castor oil ethoxylated with 15 moles of ethylene oxide (Lipal 15 CO) | 0.2 ppm |
| Test Result | 100/6 |

B.
| | |
|---|---|
| 1. Quso | 0.25 ppm |
| 2. No. 7 Process Oil (105.9SUS at 100°F) | 9.55–9.75ppm |
| 3. Pluronic F 108 (a block copolymer of polyoxyethylene and polyoxypropylene having end blocks of polyoxyethylene - M. W. 14,000; 80% polyoxyethylene) | 40 ppm |
| 4. Lipal 15 CO | 0.2 ppm |
| Test Results | 150/12 |

C.
| | |
|---|---|
| 1. Ethylene bis-stearamide (a hydrophobic solid used in defoamers) | 0.25 ppm |
| 2. No. 7 Process Oil | 9.55–9.75 ppm |
| 3. Pluronic 25R8 | 40 ppm |
| 4. Lipal 15 CO | 0.2 ppm |
| Test Result | 150/11 |

The composition of the present invention, as hereinabove described, is comprised of three essential components, and the omission of any one of the components has an adverse effect. Thus, for example, the use of a block copolymer of oxyethylene and oxypropylene wherein the end blocks are oxyethylene, instead of oxypropylene, as in the present invention, produces an inferior composition. Similarly, the substitution of the hydrophobic solid, ethylene bisstearamide for hydrophobic silica, also results in an inferior product.

The present invention is particularly advantageous in that fouling can be prevented in aqueous or polar organic systems, without adverse foaming.

Numerous modifications and variations of the present invention are possible in light of the above teachings and, therefore, within the scope of the appended claims, the invention may be practiced otherwise than as particularly described.

What is claimed is:

1. A solid non-foaming dispersing composition for dispersing contaminants in aqueous and polar organic systems, comprising:
    a. hydrophobic silica;
    b. a block copolymer of polyoxyethylene and polyoxypropylene wherein both ends of the block copolymer chain is polyoxypropylene, and
    c. a water insoluble organic spreading liquid, said components (a), (b), and (c) being present in an amount to provide a solid composition, effective to disperse contaminants in aqueous and polar organic systems without foaming.

2. The composition of claim 1 wherein the block copolymer has a weight average molecular weight from about 1000 to about 25,000.

3. The composition of claim 2 wherein the block copolymer is comprised of from 5% to 80%, by weight, of polyoxyethylene.

4. The composition of claim 3 wherein component (a) is present in an amount from 0.1% to 10%, component (b) in an amount from 10% to 90%, and component (c) in an amount from 5% to 35%, all by weight, based on the three components.

5. The composition of claim 4 wherein the composition further includes a surfactant.

6. The composition of claim 5 wherein the surfactant is present in an amount from 0.5% to 10%, by weight, based on the four components.

7. The composition of claim 6 wherein component (c) is selected from the group consisting of hydrocarbons, halohydrocarbons, long chain alcohols, long chain amines, long chain esters, fatty acids and mixtures thereof.

8. The composition of claim 7 wherein the block copolymer has a weight average molecular weight from 1500 to 15,000.

9. The composition of claim 8 wherein the block copolymer contains 80% polyoxyethylene and 20% polyoxypropylene.

10. The composition of claim 1 wherein the composition is in the form of a tablet.

11. A process for dispersing contaminants in an aqueous or polar organic system comprising:
    adding to the system in an amount effective to disperse the contaminants without foaming hydrophobic silica; water insoluble organic spreading liquid; and a block copolymer of polyoxypropylene and polyoxyethylene wherein both ends of the block copolymer chain is polyoxypropylene.

12. The composition of claim 7 wherein the block copolymer is comprised of from 40% to 80%, by weight, polyoxyethylene.

13. A process for dispersing contaminants in an aqueous or polar organic system, comprising:

adding to the system in an amount effective to disperse the contaminants without foaming a composition as defined in claim 12.

* * * * *